Figure 1:
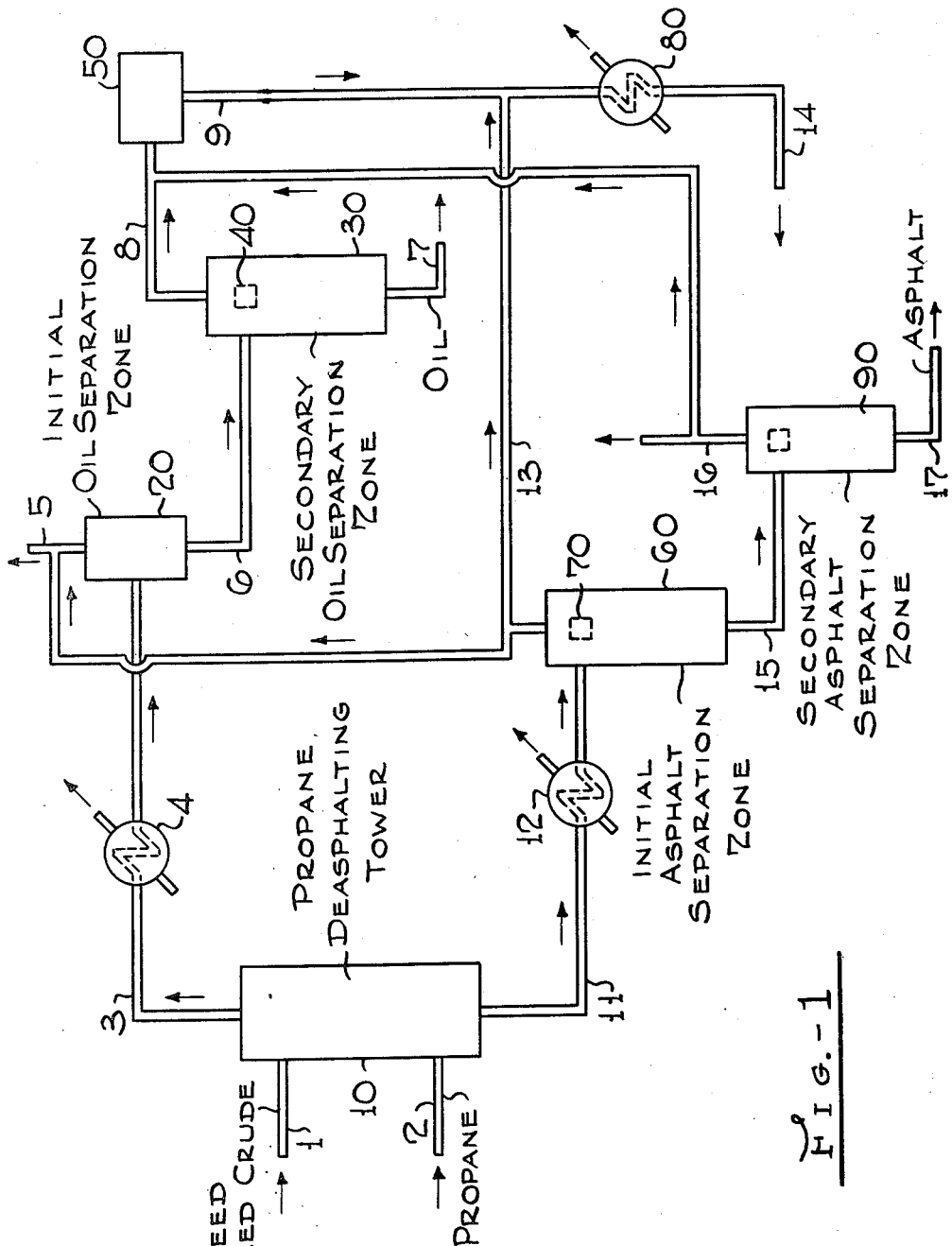

Feb. 16, 1954　　　F. H. YURASKO ET AL　　　2,669,538
SEPARATION OF VAPORS AND VISCOUS LIQUIDS
Filed Feb. 18, 1949　　　　　　　　　　　　　2 Sheets-Sheet 2

Howard C. North　Inventors
Frank H. Yurasko
By W. O. Heilman　Attorney

Patented Feb. 16, 1954

2,669,538

UNITED STATES PATENT OFFICE 2,669,538

SEPARATION OF VAPORS AND VISCOUS LIQUIDS

Frank H. Yurasko, Roselle, and Howard C. North, Westfield, N. J., assignors to Standard Oil Development Company, a corporation of Delaware Application February 18, 1949, Serial No. 77,172

6 Claims. (Cl. 196—14.46)

1

The present invention is concerned with an improved refining operation and is more specifically concerned with a method for securing the gradual dissipation of the energy of flowing streams. The invention is especially directed toward the handling of flowing streams whereby the energy of the flowing stream is dissipated and various phases segregated. In accordance with preferred adaptations of the present invention viscous liquid streams containing entrained vaporous constituents are handled in a manner to efficiently dissipate the flowing energy and to segregate or separate the vaporous constituents from the viscous liquid. These improvements are secured by shredding the flowing stream, by passing the same into a mass of woven or closely adhered material.

In the manufacture of various chemicals, particularly in the refining of petroleum oils, it is necessary to flow streams from one point to another and to dissipate the energy of the flowing stream at a predetermined point. It is also necessary in various phases of refining operations to segregate various phases one from the other as for example to segregate a vaporous material from a liquid material. This segregation of vapor constituents from liquid materials becomes progressively more difficult as the viscosity of the liquid increases since a greater quantity of vaporous constituents is entrained or trapped therein. One example of where this problem is encountered is in the manufacture of high quality asphalts from petroleum oils.

In the manufacture of high quality asphalts from petroleum oils, a reduced crude containing asphalts is usually subjected to a solvent deasphalting process. One solvent conventionally utilized for the separation of the oily constituents from the asphaltic constituents comprise propane. However, in an operation of this character the asphalt fraction contains associated therewith a relatively large quantity of the solvent, such as propane. The separation of the propane is usually accomplished by heating the asphaltic stream to a temperature above the vaporization point of the propane. The heated liquid asphalt stream containing vaporous solvent is introduced into a separation zone which usually comprises a flash separation zone. However, due to the viscous nature of the liquid phase, it is relatively difficult to secure a complete and satisfactory separation of the vaporous constituents. One expedient which has been utilized in an attempt to minimize this problem is to employ relatively large separation zones and also to utilize in conjunction therewith a baffle plate or similar type structures. The incoming stream is impinged against the baffle plate or caused to circulate around the periphery of the flash zone. While these methods serve to secure the desired separation it is relatively expensive due to the size of the equipment required for a particular throughput. Furthermore, when relatively heavy viscous liquids are involved, as for example asphaltic constituents, a large degree of foaming and entrainment occurs. Thus, it is necessary to employ entrainment separators, knockout means and similar equipment.

It has now been discovered that these problems can to a large extent be eliminated providing the flowing stream is handled in a manner to progressively dissipate its flowing energy. This is preferably accomplished by passing the stream into a woven mass, such as a woven mass of relatively fine wire which contains a relatively large per cent of free space.

Figure 2:
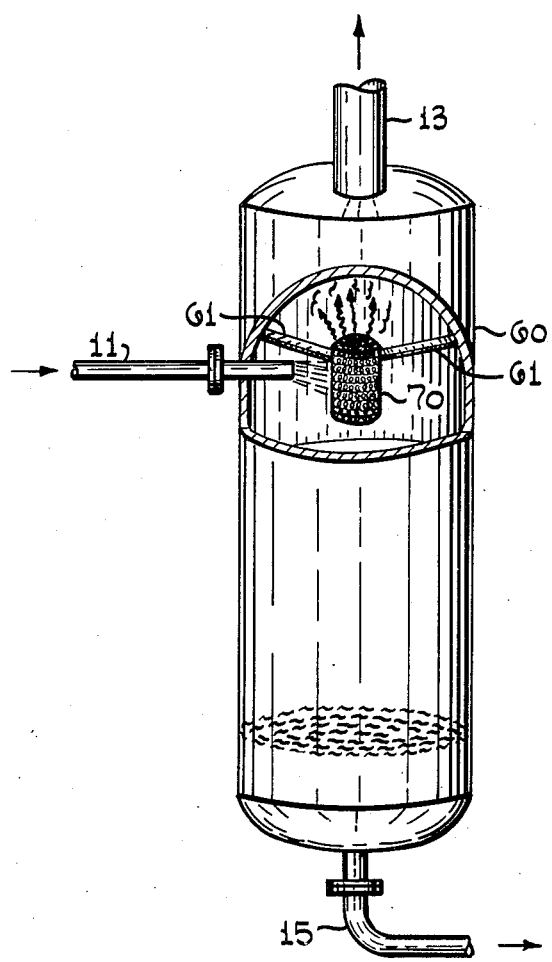

If this be done, the flowing stream is finely shredded into a multiplicity of streams and the energy of the entire mass dissipated progressively. The present invention is particularly adapted for the manufacture of high quality asphalts. The invention may be readily understood by reference to the drawings illustrating embodiments of the same. Figure 1 illustrates one embodiment of the invention as it is applied to the manufacture of high quality petroleum asphalts, while Figure 2 illustrates in some detail the character of the filamentous material.

Referring specifically to Figure 1, a feed oil which for the purpose of illustration is assumed to be a reduced crude from a asphaltic crude is introduced into solvent deasphalting tower 10 by means of feed line 1. A solvent which for the purpose of illustration is taken to comprise liquified propane is introduced into zone 10 by means of line 2. The respective phases flow countercurrently under conditions to secure intimate mixing of the respective phases. Temperature and pressure conditions as well as feed rates in zone 10 are maintained to secure the desired separation, and will depend to some extent upon the character of the asphaltic feed oil and the particular solvent or solvent mixture being utilized. If propane be employed as a solvent, a desirable feed is in the range from about 6 to 10 volumes of propane per volume of oil feed. The temperature maintained in the bottom of the propane tower is in the range from about 100 to 120° F., while the top temperature is in the range from about 140 to 160° F. It is to be understood that suitable contacting and distributing means may be employed within the tower itself.

The oil-solvent stream is removed from the top of zone 10 by means of line 3, further heated in heating zone 4 to a temperature above the vaporization temperature of the propane at the existing pressure and introduced into a flash separation zone 20. Vaporized propane is removed overhead from zone 20 by means of line 5 while the oil stream still containing a relatively small amount of vaporized propane is removed from zone 20 by means of line 6. In accordance with the present invention this stream is introduced into zone 30 by impinging the flowing stream onto and into a mass of fibrous material 40 which preferably comprises a mass of fine woven wire. This mass of woven wire is maintained at the top of distillation zone 30 and is disposed approximately from about 6" to 18" away from the end of line 6. The incoming stream containing vaporous and liquid constituents is shredded into a multiplicity of streams of minute diameter under conditions that the vaporous constituents are effectively and efficiently separated from the liquid constituents in the absence of any foaming whatsoever. Oil constituents completely free of propane are withdrawn from the bottom of zone 30 by means of line 7, and handled or further refined in any manner desired. The freed vaporous propane is withdrawn from the top of zone 30 by means of line 8, and preferably passed through a compressor zone 50. The compressed propane is removed from zone 50 by means of line 9, passed through a condensing zone 80 and preferably recycled to the system by means of line 14.

The asphalt-solvent stream is removed from depropanizing tower 10 by means of line 11, passed through heating unit 12 which is maintained at a temperature above the vaporization point of the solvent. This stream is introduced into zone 60 in a manner to impinge the stream into a web-like mass of material, preferably into a mass of wire 70 maintained at the top of tower 60. The asphalt stream containing entrained vaporous propane is shredded into a multiplicity of streams of very small diameters. Thus, the energy of the entire flowing stream is gradually dissipated resulting in the release of vaporous solvent. The freed propane is withdrawn overhead from zone 60 by means of line 13 and is preferably combined with the propane removed overhead from zone 20. This combined stream is combined with the compressed propane stream removed from zone 50 prior to passing the combined streams to condenser 80.

A bottoms stream of asphalt containing a relatively small amount of propane is withdrawn from zone 60 by means of line 15 and introduced into zone 90. Here the asphalt stream is directed into a mass of woven or equivalent material which preferably comprises a mass of wire. The energy of the stream is gradually dissipated, the propane released and is removed overhead by means of line 16. This stream is preferably combined with the overhead propane stream removed from zone 30 by means of line 8. An asphalt stream completely free of propane is removed from zone 90 by means of line 17 and handled or further refined as desired. Figure 2 illustrates in some detail the character of the filamentous mass 70 supported in the vapor space of zone 60 by means of suitable supports 61.

The present invention is broadly concerned with an improved process for the dissipation of energy of a flowing stream. This is accomplished by impinging the flowing stream on a mass of material such as fine wire or other suitable substances. The mass should be finely woven and should have relatively large proportion of free space, as for example, greater than about 50%. It is particularly preferred that the extent of free air space in the mass be in excess of about 80% and preferably be in the range of about 95–97%. The diameter of the material, as for example wire, should be in the range from about .005" to .020" preferably in the range from .009" to .011". The mass, as pointed out heretofore, may be of any suitable material, but it is preferred that it be of a metal as for example, fine wire having a composition adapted to specifically resist the corrosion of any particular corrosive stream. The mass is preferably of a spongy or of a resilient nature.

The mass employed in the present invention need not be woven, but may comprise a mat of very porous material. The material may be crinkled wire. Plastic material likewise may be used and substances such as silica fiber. If the stream being treated is at a relatively low temperature, the mass may comprise an ordinary carbon steel. If the stream, the energy of which is being dissipated, contains corrosive substances such as hydrogen sulphide acidic constituents, as for example, aliphatic and naphthenic acids, it is preferred that the mass comprise an alloy steel. If the stream being handled contains corrosive substances but is at a relatively low temperature, the mass may comprise a copper-nickel steel, as for example, Monel metal. On the other hand if the stream being handled is at a relatively high temperature, but is non-corrosive, it has been found that a steel containing from about 11% to 13% chromium is satisfactory. However, if the stream being handled is at a high temperature and also contains corrosive materials, it has been found that a chromium-nickel steel, as for example KA2S is satisfactory. A steel of this character contains about 18% chromium and 8% nickel. If the stream is extremely corrosive a very desirable material to employ as the mass comprises Tantalum or silica fiber.

The amount of mass of wire or equivalent material utilized may vary appreciably depending upon the velocity of the particular stream it is being used in conjunction with, as well as, upon the diameter of the stream and also upon the actual chemical and physical characteristics of the flowing stream. However, in general when the diameter of the flowing stream is in the range from about 2" to 6" and the flowing velocity is in the range from about 15' to 200' per second, it is preferred that the face of the mass approximate a rectangle having sides from about 9" to 20" and that the thickness of the mass vary in the range from about 3" to 12". In general it is preferred that the mass be approximately 6" to 9" thick and that it be disposed from about 2" to 18" away from the inlet of the flowing stream in a manner that the stream will impinge at right angles on the face of the mass.

In a more specific concept of the present invention the process is directed toward the efficient releasing of an entrained vapor phase from a liquid phase. This is accomplished by shredding the liquid phase containing the entrained vapor phase into a multiplicity of very fine streams thus releasing the vaporous constituents. By operating in this manner emulsification and foaming difficulties due to excessive intermixing of the respective phases are eliminated or substantially reduced.

A direct application of the present invention is in the manufacture of heavy viscous products as for example petroleum asphalt products wherein a liquified normally gaseous substance is used as a solvent in the manufacture of the same. In an operation of this character an embodiment of which is disclosed in the drawing, a feed oil may comprise any reduced crude containing asphaltic constituents. The solvent may comprise any suitable solvent, but generally comprises a liquified normally gaseous hydrocarbon, as for example propane. The present invention may be more fully understood by the following example illustrating an embodiment of the same:

Example

An asphaltic reduced crude was countercurrently contacted in a propane tower wherein about 8 volumes of propane were used per volume of oil. The temperature at the top of the tower was maintained at about 150° F., while the temperature in the bottom of the tower was maintained at about 110° F. Under these conditions approximately 75% of the oil based upon feed was removed from the top of the tower. The ratio of propane to oil in this stream was approximately 12 to 1. This stream was heated to about 400° F. and flashed under conditions to remove overhead a large amount of the propane. The oil stream at about 350° F. and containing about 10% of propane was introduced into the top of a depropanizing tower. In accordance with the present invention this stream was impinged onto and into a mass of steel wire, the dimensions of which were about 12" x 12" x 6". The free space of the mass employed was about 95%. Under these conditions substantially no emulsification of the oil occurred and a rapid and efficient separation of the propane was secured. When this method was not utilized with respect to this stream emulsification difficulties occurred and it was relatively difficult to secure complete removal of the propane from the oil phase.

The stream withdrawn from the bottom of the solvent treating tower comprised about 25% of the oil feed. The ratio of propane to oil in this stream was approximately 1/1. This stream was heated to a temperature of about 450° F. and flashed into an initial separation zone wherein substantially all of the propane was removed from the asphaltic constituents. In introducing the stream into this initial separation zone, the stream was impinged upon a mass of steel wire, the dimensions of which were about 12" x 12" x 6". The mass of steel wire comprised approximately 95% of free space.

An asphalt stream was withdrawn from the bottom of the initial separation zone at a temperature of about 450° F. This stream contained approximately 5% propane. In accordance with the present invention this stream was introduced into the top of a depropanizing tower and impinged onto a mass of fine steel wire having dimensions of about 12" x 12" x 6". The amount of free space in the mass itself was about 95%. Rapid and efficient separation of the propane was secured from the asphaltic constituents. The propane was removed overhead while the asphalt stream free of propane was removed from the bottom of the zone. In operations wherein the mass was not employed for shredding, the incoming stream emulsifications problems were encountered. It was also relatively difficult to remove all of the propane from the product asphalt stream.

As discussed, the invention is broadly concerned with a process for the gradual dissipation of energy of a flowing stream, particularly when the flowing stream is introduced into a vessel of larger diameter. This is accomplished by utilizing a mass of finely woven material in order to shred the flowing stream into a multiplicity of fine streams. The invention is particularly adapted for the segregation of vaporous constituents from liquid constituents, especially when the liquid constituents are of a viscous nature. The viscosity of a liquid varies appreciably depending upon temperature, the variation depending upon the coefficient of the particular liquid. However, in general the present invention is particularly adapted for the handling of liquids which have viscosities in excess of about 200 seconds Saybolt Universal at 100° F. Viscous liquids having Furol viscosities in excess of about 30 seconds at 275° F. are also efficiently handled by the present process.

One direct application of the present invention is in the manufacture of high quality asphalts in a process wherein a liquified normally gaseous hydrocarbon is employed in the manufacture of the asphalts and wherein the liquified hydrocarbon is removed from the product stream by a flashing operation. The viscosity of the asphalt streams in the manufacture of high quality asphalts are usually in the range from about 30 to about 1200 seconds Furol at 300° F. If higher temperatures be employed, as for example in the range from about 425–475° F., the Furol viscosities are in the general range from about 30–50 seconds Furol.

The size of the resilient mass employed, as pointed out heretofore, may vary appreciably. However, in general it is preferred that the dimensions of the sides of the face of the mass upon which the stream is impinged be from about 1½ to three times the diameter of the flowing stream. The thickness or depth of the mass likewise should be from about ½ to 1½ times the diameter of the flowing stream impinged thereon.

Having described the invention it is claimed:

1. Process for the separation of entrapped gaseous constituents from a viscous liquid flowing in a conduit, said viscous liquid being characterized by having a viscosity from about 30–1200 seconds Furol at 300° F. which comprises heating said viscous liquid to a temperature above the vaporization temperature of said entrapped gaseous constituents, passing said heated viscous liquid from said conduit through a vapor space at a high velocity into a separation zone and impinging said viscous liquid onto and into a resilient mass of a filamentous material maintained in said separation zone, said mass being characterized by having a thickness in the range from about 3 inches to 12 inches and being further characterized by having at least 50% free space, whereby separation of said gaseous constituents and the viscous liquid is secured, removing the gaseous constituents from the top of said separation zone and said viscous liquid from the bottom of said separation zone.

2. Process as defined by claim 1 wherein said flowing stream is impinged upon a woven resilient mass of filamentous material, which mass is characterized by having at least 95% of free space.

3. Improved process for the separation of asphaltic constituents from hydrocarbons which comprises adding a liquefied normally gaseous hydrocarbon to an asphaltic oil, separating an asphalt phase containing a portion of said liquefied normally gaseous hydrocarbon, heating said asphalt phase to a temperature above the vaporization temperature of said liquefied normally gaseous hydrocarbon, passing said heated stream from a conduit through a vapor space at a high velocity into a separation zone and impinging said stream onto and into a resilient mass of filamentous material maintained in said separation zone, said mass being characterized by having a thickness in the range from about 3 inches to 12 inches and being further characterized by having at least 50% free space whereby separation of the vaporous hydrocarbons and the liquid asphalt is secured, removing the vaporous hydrocarbons from the top of said separation zone and liquid asphalt from the bottom of said separation zone.

4. Process as defined by claim 3 wherein said liquefied normally gaseous hydrocarbon comprises propane and wherein said asphalt stream is heated to a temperature about 400° F.

5. Process as defined by claim 3 wherein the velocity is in the range from 15 to 200 linear ft. per second.

6. In an apparatus for disengaging a gaseous fluid from a liquid in which the said liquid and gaseous fluid is introduced to an intermediate level of a vertically elongated disengagement vessel through a conduit inlet at a sufficiently high flow rate to enter the said vessel as a solid fluid stream, the improvement which comprises a mass of fine filamentous solids positioned within said vessel directly in line with fluid flow from the said inlet, said filamentous solids being characterized by a free space of more than about 80% and having a filament diameter in the range of about 0.005 inch to 0.02 inch, said mass of filamentous solids being spaced from the said inlet at a distance of about 1 to 3 times the diameter of the said inlet, whereby said fluid stream impinges directly on said filamentous mass causing said gaseous fluid and liquid to disengage to permit removal of gas from the upper portion of said vessel, and liquid from the bottom portion of said vessel.

FRANK H. YURASKO.
HOWARD C. NORTH.

References Cited in the file of this patent

UNITED STATES PATENTS

| Number | Name | Date |
| --- | --- | --- |
| 1,240,385 | Sweetland | Sept. 18, 1917 |
| 1,255,018 | Jones | Jan. 29, 1918 |
| 1,379,056 | Smith | May 24, 1921 |
| 1,463,990 | Wilson | Aug. 7, 1923 |
| 2,018,871 | Pier et al. | Oct. 29, 1935 |
| 2,110,845 | Whiteley | Mar. 8, 1938 |
| 2,420,115 | Walker et al. | May 6, 1947 |

FOREIGN PATENTS

| Number | Country | Date |
| --- | --- | --- |
| 529,990 | France | Sept. 22, 1921 |

OTHER REFERENCES

"Chemical Engineers' Handbook," John H. Perry, Editor, third edition, McGraw-Hill Book Co., Inc., New York, 1950, pages 967–68; 1022–27.